United States Patent
Wang

(10) Patent No.: US 12,096,001 B2
(45) Date of Patent: Sep. 17, 2024

(54) SYSTEMS AND METHODS FOR VIDEO DECODING

(71) Applicant: ZHEJIANG DAHUA TECHNOLOGY CO., LTD., Zhejiang (CN)

(72) Inventor: Shuyao Wang, Hangzhou (CN)

(73) Assignee: ZHEJIANG DAHUA TECHNOLOGY CO., LTD., Hangzhou (CN)

(*) Notice: Subject to any disclaimer, the term of this patent is extended or adjusted under 35 U.S.C. 154(b) by 27 days.

(21) Appl. No.: 17/457,921

(22) Filed: Dec. 7, 2021

(65) Prior Publication Data

US 2022/0094944 A1 Mar. 24, 2022

Related U.S. Application Data

(63) Continuation of application No. PCT/CN2019/129304, filed on Dec. 27, 2019.

(30) Foreign Application Priority Data

Jun. 25, 2019 (CN) .......................... 201910555314.0

(51) Int. Cl.
*H04N 19/157* (2014.01)
*H04N 19/136* (2014.01)
(Continued)

(52) U.S. Cl.
CPC ......... *H04N 19/157* (2014.11); *H04N 19/136* (2014.11); *H04N 19/146* (2014.11); *H04N 19/184* (2014.11); *H04N 19/423* (2014.11)

(58) Field of Classification Search
CPC .. H04N 19/157; H04N 19/136; H04N 19/146; H04N 19/184; H04N 19/423;
(Continued)

(56) References Cited

U.S. PATENT DOCUMENTS

2013/0002965 A1  1/2013  Chan et al.
2013/0021536 A1  1/2013  Kamida
(Continued)

FOREIGN PATENT DOCUMENTS

CN   102075745 A   5/2011
CN   103096163 A   5/2013
(Continued)

OTHER PUBLICATIONS

International Search Report in PCT/CN2019/129304 mailed on Mar. 17, 2020, 4 pages.
(Continued)

*Primary Examiner* — Tracy Y. Li
(74) *Attorney, Agent, or Firm* — METIS IP LLC

(57) ABSTRACT

The present disclosure relates to systems and methods for video decoding with a video decoding chip. The video decoding chip may include one or more input channels and one or more output channels. The systems and methods may include detecting a flag bit of each of the one or more input channels. The flag bit of an input channel may indicate a status of receiving its corresponding stream of encoded video data. The systems and methods may include determining an operating state of the one or more input channels based on the flag bits. The operating state of an input channel may include an open state and a closed state of the input channel. The systems and methods may further include determining at least one of the one or more output channels to output the corresponding stream of decoded video data based on the input channels in the open state.

19 Claims, 9 Drawing Sheets

(51) Int. Cl.
*H04N 19/146* (2014.01)
*H04N 19/184* (2014.01)
*H04N 19/423* (2014.01)

(58) Field of Classification Search
CPC ...... H04N 5/77; H04N 19/436; H04N 19/156; H04N 19/42; H04N 5/765; H04N 19/44; G09G 5/003; G09G 5/005; G09G 2370/20
See application file for complete search history.

(56) References Cited

U.S. PATENT DOCUMENTS

| | | | |
|---|---|---|---|
| 2014/0029663 A1 | 1/2014 | Su et al. | |
| 2014/0307174 A1 | 10/2014 | Zhu | |
| 2015/0103919 A1* | 4/2015 | Hattori | H04N 19/48 375/240.26 |
| 2015/0358641 A1* | 12/2015 | Choi | H04N 19/597 375/240.13 |
| 2019/0028722 A1* | 1/2019 | Choi | G06T 3/4015 |
| 2019/0230358 A1* | 7/2019 | Lu | H04N 19/136 |
| 2020/0219291 A1* | 7/2020 | Kim | H04N 19/20 |
| 2021/0006786 A1* | 1/2021 | Gao | H04N 19/159 |
| 2021/0352331 A1* | 11/2021 | Ikeda | H04N 19/96 |

FOREIGN PATENT DOCUMENTS

| | | |
|---|---|---|
| CN | 104185027 A | 12/2014 |
| CN | 104683860 A | 6/2015 |
| CN | 105516589 A | 4/2016 |
| CN | 205265822 U | 5/2016 |
| CN | 105761681 A | 7/2016 |
| CN | 106446873 A | 2/2017 |
| CN | 106534852 A | 3/2017 |
| CN | 106657815 A | 5/2017 |
| CN | 106791551 A | 5/2017 |
| CN | 107197170 A | 9/2017 |
| CN | 107948198 A | 4/2018 |
| CN | 105208321 B | 5/2018 |
| CN | 108197601 A | 6/2018 |
| CN | 108400977 A | 8/2018 |
| EP | 1641273 A1 | 3/2006 |
| WO | 2020258805 A1 | 12/2020 |

OTHER PUBLICATIONS

Written Opinion in PCT/CN2019/129304 mailed on Mar. 17, 2020, 6 pages.
First Office Action in Chinese Application No. 201910555314.0 mailed on Mar. 1, 2021, 17 pages.
The Extended European Search Report in European Application No. 19934684.2 mailed on Apr. 25, 2022, 8 pages.

* cited by examiner

SYSTEMS AND METHODS FOR VIDEO DECODING

CROSS-REFERENCE TO RELATED TO APPLICATIONS

This application is a continuation of International Patent Application No. PCT/CN2019/129304, field on Dec. 27, 2019, which claims priority to Chinese Application No. 201910555314.0, filed on Jun. 25, 2019, the entire contents of which are hereby incorporated by reference.

TECHNICAL FIELD

The present disclosure relates to the field of video processing, and in particular, to systems and methods for video decoding.

BACKGROUND

Video data (e.g., motion pictures, television broadcasts, movie playbacks, etc.) generally contains rich information, which can be used in a variety of industries, such as education, entertainment, advertising, security, etc. The video data are often delivered to a terminal through a transmission network or other delivery mechanism. In order to reduce the bandwidth needed to transmit the multimedia content(s), video data may be encoded using one or more of a variety of compression schemes, such as moving picture experts group 2 or 4 (MPEG-2 or MPEG-4), H.261, H.263, H.264, H.265, etc.

Before displaying the video data on the terminal, the encoded video data generally needs to be decoded. In some cases, the encoded video data can be decoded by a video decoding chip. The video decoding chip includes one or more input channels and one or more output channels. When the video decoding chip works, regardless of whether an input channel receives of a stream of encoded video data or not, the input channel and its corresponding output channel may be in the open state, resulting in high power consumption of the video decoding chip. Therefore, in order to reduce the power consumption of the video decoding chip and complete the decoding of the encoded video data, it is desirable to provide systems and methods for decoding the video data by the video decoding chip in a more effective way.

SUMMARY

In one aspect of the present disclosure, a system for video decoding is provided. The system may include one or more input channels and one or more output channels coupled to the one or more input channels. Each of the one or more input channels may be capable of receiving a stream of encoded video data and decoding the stream of encoded video data. Each of the one or more output channels may be capable of outputting a stream of decoded video data. The system may also include at least one storage device and at least one processor in communication with the at least one storage device. The at least one storage device may store a set of instructions. When executing the set of instructions, the at least one processor may be configured to cause the system to perform one or more operations including detecting a flag bit of each of the one or more input channels. The flag bit of an input channel may indicate a status of receiving its corresponding stream of encoded video data. The at least one processor may be further configured to cause the system to perform one or more operations including determining an operating state of the one or more input channels based on the flag bits. The operating state of an input channel may include an open state of the input channel and a closed state of the input channel. The at least one processor may be further configured to determine at least one of the one or more output channels to output the corresponding stream of decoded video data based on the input channels in the open state.

In some embodiments, the flag bit of an input channel may include a first value and a second value. To determine an operating state of the one or more input channels, the at least one processor may be configured to cause the system to perform one or more additional operations including: detecting whether the flag bit of at least one of the one or more input channels is of the second value; in response to a determination that the flag bit of the at least one of the one or more input channels is of the second value, determining the at least one of the one or more input channels as at least one target input channel; and controlling the at least one target input channel to be in the open state.

In some embodiments, the at least one processor may be further configured to cause the system to perform one or more additional operations including detecting whether the flag bit of at least one of the one or more input channels changes, and updating the at least one target input channel based on a determination that the flag bit of the at least one of the one or more input channels changes.

In some embodiments, to update the at least one target input channel, the at least one processor may be configured to cause the system to perform one or more additional operations including, in response to a determination that the flag bit of a first input channel of the one or more input channels changes from the first value to the second value, updating the at least one target input channel by designating the first input channel as one of the at least one target input channel.

In some embodiments, to update the at least one target input channel, the at least one processor may be configured to cause the system to perform one or more additional operations including: in response to a determination that the flag bit of a second input channel of the one or more input channels changes from the second value to the first value, updating the at least one target input channel by removing the second input channel from the at least one target input channel; and controlling the second input channel to be in the closed state.

In some embodiments, to determine at least one of the one or more output channels to output the corresponding stream of decoded video data, the at least one processor may be configured to cause the system to perform one or more additional operations including determining an output mode corresponding to the at least one target input channel based on a video format of the stream of encoded video data on each of the at least one target input channel, and determining the at least one of the one or more output channels based on the output mode.

In some embodiments, the at least one processor may be configured to cause the system to perform one or more additional operations including detecting whether the video format of the stream of encoded video data on the at least one target input channel changes, and updating the output mode based on a determination that the video format of the stream of encoded video data on the at least one target input channel changes.

In some embodiments, the at least one processor may be configured to cause the system to perform one or more additional operations including detecting intermittently or continuously whether the flag bit of at least one of the one or more input channels changes, or detecting intermittently or continuously whether the video format of the stream of encoded video data on the at least one target input channel changes.

In some embodiments, the video format may include a data volume and a resolution of the stream of encoded video data.

In some embodiments, the output mode may include a 4X mode, a 2X mode, or a 1X mode.

In some embodiments, each input channel may include one or more function modules. The operating state of the input channel may refer to an operating state of at least one of the one or more function modules.

In another aspect of the present disclosure, a method is provided. The method may be implemented on a computing device having at least one processor, at least one computer-readable storage medium, and a communication platform connected to a network. The method may include detecting a flag bit of each of one or more input channels. The flag bit of an input channel may indicate a status of receiving its corresponding stream of encoded video data. The method may also include determining an operating state of the one or more input channels based on the flag bits. The operating state of an input channel may include an open state of the input channel and a closed state of the input channel. The method may further include determining at least one of one or more output channels to output a stream of decoded video data based on the input channels in the open state.

In yet another aspect of the present disclosure, a non-transitory computer-readable storage medium is provided. The non-transitory computer-readable storage medium may include at least one set of instructions. When executed by at least one processor of a computing device, the at least one set of instructions may direct the at least one processor to perform acts of detecting a flag bit of each of one or more input channels, the flag bit of an input channel indicating a status of receiving its corresponding stream of encoded video data; determining an operating state of the one or more input channels based on the flag bits, the operating state of an input channel including an open state of the input channel and a closed state of the input channel; and determining at least one of one or more output channels to output a stream of decoded video data based on the input channels in the open state.

In yet another aspect of the present disclosure, a system for video decoding is provided. The system may include a detection module, a determination module. The detection module may be configured to detect a flag bit of each of one or more input channels. The flag bit of an input channel may indicate a status of receiving its corresponding stream of encoded video data. The determination module may be configured to determine an operating state of the one or more input channels based on the flag bits. The operating state of an input channel may include an open state of the input channel and a closed state of the input channel. The determination module may further be configured to determine at least one of one or more output channels to output a stream of decoded video data based on the input channels in the open state.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting schematic embodiments, in which like reference numerals represent similar structures throughout the several views of the drawings, and wherein.

DETAILED DESCRIPTION

Figure 1:
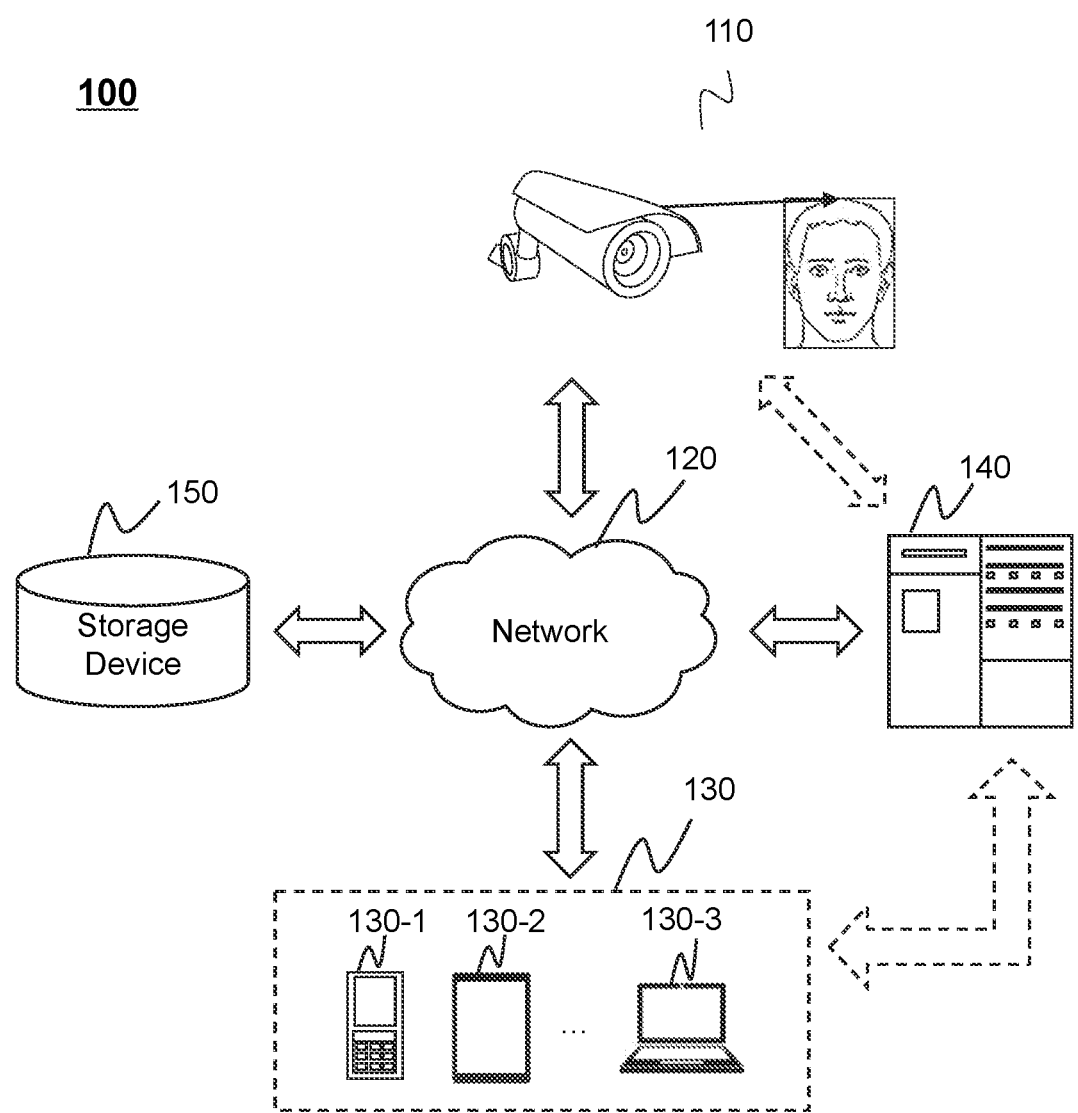
FIG. 1 is a schematic diagram illustrating an exemplary video processing system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, sections or assemblies of different levels in ascending order. However, the terms may be displaced by another expression if they achieve the same purpose.

The modules (or units, blocks, units) described in the present disclosure may be implemented as software and/or hardware modules and may be stored in any type of non-transitory computer-readable medium or another storage device. In some embodiments, a software module may be compiled and linked into an executable program. It will be appreciated that software modules can be callable from other modules or from themselves, and/or can be invoked in response to detected events or interrupts. Software modules configured for execution on computing devices can be provided on a computer readable medium, such as a compact disc, a digital video disc, a flash drive, a magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules (e.g., circuits) can be included of connected or coupled logic units, such as gates and flip-flops, and/or can be included of programmable units, such as programmable gate arrays or processors. The modules or computing device functionality described herein are preferably implemented as hardware modules, but can be software modules as well. In general, the modules described herein refer to logical modules that can be combined with other modules or divided into units despite their physical organization or storage.

Generally, the word "module," "sub-module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts.

Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure.

The present disclosure relates to systems and methods for video decoding with a video decoding chip. The video decoding chip may include one or more input channels. Each input channel may be capable of receiving a stream of encoded video data and decoding the stream of encoded video data. The video decoding chip may also include one or more output channels. Each output channel may be capable of outputting a stream of decoded video data. In some embodiments, a portion of the input channels may receive stream(s) of encoded video data, and the other portion of the input channels may not receive a stream of encoded video data. In order to reduce the power consumption, the input channels without stream(s) of encoded video data may be turned into a closed state. Besides, a portion of the output channels may not output the stream(s) of decoded video data, and be turned into the closed state.

The systems and methods may detect a flag bit of each of the one or more input channels. The flag bit of an input channel may indicate a status of receiving its corresponding stream of encoded video data. The flag bit of an input channel may include a first value and a second value. The systems and methods may determine an operating state of the one or more input channels. The operating state of an input channel may include an open state and a closed state. The systems and methods may control the input channel(s) whose flag bit is of the second value to be in the open state, and control the input channel(s) whose flag bit is of the first value to be in the closed state. The systems and methods may determine at least one of the one or more output channels to output the corresponding stream of decoded video data based on the input channels in the open state.

FIG. 1 is a schematic diagram illustrating an exemplary video processing system 100 according to some embodiments of the present disclosure. The video processing system 100 may be configured for video decoding. The video processing system 100 may include a capture device 110, a network 120, a terminal 130, a processing device 140, and a storage device 150. The components of the video processing system 100 may be connected to each other in one or more of various ways. Merely by way of example, as illustrated in FIG. 1, the capture device 110 may be connected to the processing device 140 via the network 120. As another example, the capture device 110 may be connected to the processing device 140 directly as indicated by the bi-directional arrow in dotted lines linking the capture device 110 and the processing device 140. As a further example, the storage device 150 may be connected to the processing device 140 directly or through the network 120. As still a further example, the terminal 130 may be connected to the processing device 140 directly (as indicated by the bi-directional arrow in dotted lines linking the terminal 130 and the processing device 140) or through the network 120.

The capture device 110 may be configured to capture one or more streams of video data. The stream(s) of video data may include motion pictures, television broadcasts, movie playbacks, etc. In order to reduce the bandwidth needed to transmit the stream(s) of video data, the stream(s) of video data may be encoded into one or more stream(s) of encoded video data using one or more of a variety of compression schemes, such as moving picture experts group 2 or 4 (MPEG-2 or MPEG-4), H.261, H.263, H.264, H.265, etc. The capture device 110 may be or include one or more cameras. In some embodiments, the capture device 110 may be a digital camera, a video camera, a security camera, a web camera, a smartphone, a tablet, a laptop, a video gaming console equipped with a web camera, a camera with multiple lenses, a camcorder, etc.

The network 120 may facilitate the exchange of information and/or data. In some embodiments, one or more components of the video processing system 100 (e.g., the capture device 110, the terminal 130, the processing device 140, the storage device 150) may send information and/or data to another component(s) in the video processing system 100 via the network 120. For example, the processing device 140 may process an image obtained from the capture device 110 via the network 120. As another example, the capture device 110 may obtain user instructions from the terminal 130 via the network 120. In some embodiments, the network 120 may be any type of wired or wireless network, or combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the video processing system 100 may be connected to the network 120 to exchange data and/or information.

The terminal 130 include a mobile device 130-1, a tablet computer 130-2, a laptop computer 130-3, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, eyeglasses, a helmet, a watch, clothing, a backpack, an accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, an Oculus Rift™, a HoloLens™, a Gear VR™, etc. In some embodiments, the terminal 130 may remotely operate the capture device 110. In some embodiments, the terminal 130 may operate the capture device 110 via a wireless connection. In some embodiments, the terminal 130 may receive information and/or instructions inputted by a user, and send the received information and/or instructions to the capture device 110 or to the processing device 140 via the network 120. In some embodiments, the terminal 130 may be part of the processing device 140. In some embodiments, the terminal 130 may be omitted.

In some embodiments, the processing device 140 may process data obtained from the capture device 110, the terminal 130, or the storage device 150. In some embodiments, the processing device 140 may include or be part of a video decoding chip, and may decode one or more streams of encoded video data. The processing device 140 may be a central processing unit (CPU), a digital signal processor (DSP), a system on a chip (SoC), a microcontroller unit (MCU), or the like, or any combination thereof. In some embodiments, the processing device 140 may be a single server or a server group. The server group may be centralized or distributed. In some embodiments, the processing device 140 may be local to or remote from one or more other components of the video processing system 100. For example, the processing device 140 may access information and/or data stored in the capture device 110, the terminal 130, and/or the storage device 150 via the network 120. As another example, the processing device 140 may be directly connected to the capture device 110, the terminal 130, and/or the storage device 150, to access stored information and/or data. In some embodiments, the processing device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

The storage device 150 may store data and/or instructions. In some embodiments, the storage device 150 may store data or images obtained from the capture device 110, the terminal 130 and/or the processing device 140. In some embodiments, the storage device 150 may store data and/or instructions that the processing device 140 may execute or use to perform exemplary methods described in the present disclosure. In some embodiments, the storage device 150 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc.

Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components of the video processing system 100 (e.g., the capture device 110, the terminal 130, the processing device 140). One or more components in the video processing system 100 may access the data or instructions stored in the storage device 150 via the network 120. In some embodiments, the storage device 150 may be directly connected to or communicate with one or more components in the video processing system 100 (e.g., the capture device 110, the terminal 130, the processing device 140). In some embodiments, the storage device 150 may be part of the capture device 110, or the processing device 140.

Figure 2:
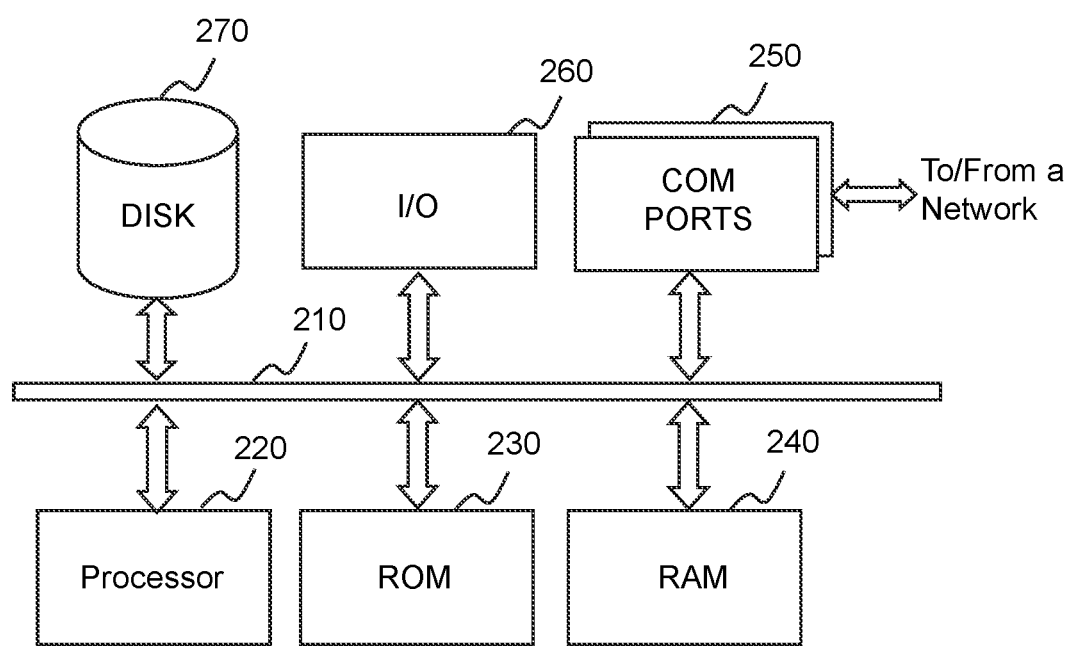
FIG. 2 is a schematic diagram illustrating exemplary hardware and/or software components of a computing device according to some embodiments of the present disclosure.

FIG. 2 is a schematic diagram illustrating exemplary hardware and software components of a computing device 200 according to some embodiments of the present disclosure. In some embodiments, the capture device 110, the terminal 130, the processing device 140 may be implemented on the computing device 200. For example, the processing device 140 may be implemented on the computing device 200 and configured to perform functions of the processing device 140 disclosed in this disclosure.

The computing device 200 may be a special purpose computer used to implement a video processing system for the present disclosure. The computing device 200 may be used to implement any component of the video processing system as described herein. For example, the processing device 140 may be implemented on the computing device, via its hardware, software program, firmware, or a combination thereof. Although only one such computer is shown, for convenience, the computer functions relating to the image processing as described herein may be implemented in a distributed fashion on a number of similar platforms, to distribute the processing load.

The computing device 200, for example, may include a COM port 250 connected to and/or from a network connected thereto to facilitate data communications. The computing device 200 may also include a processor 220, in the form of one or more processors (or CPUs), for executing program instructions. The exemplary computing device may include an internal communication bus 210, different types of program storage units and data storage units (e.g., a disk 270, a read only memory (ROM) 230, a random access memory (RAM) 240), various data files applicable to computer processing and/or communication. The exemplary computing device may also include program instructions stored in the ROM 230, RAM 240, and/or another type of non-transitory storage medium to be executed by the processor 220. The method and/or process of the present disclosure may be implemented as the program instructions. The computing device 200 also includes an I/O device 260 that may support the input and/or output of data flows between the computing device 200 and other components.

The computing device 200 may also receive programs and data via the communication network.

Merely for illustration, only one CPU and/or processor is described in the computing device 200. However, it should be noted that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes operation A and the second processor executes operation B, or the first and second processors jointly execute operations A and B).

Figure 3:
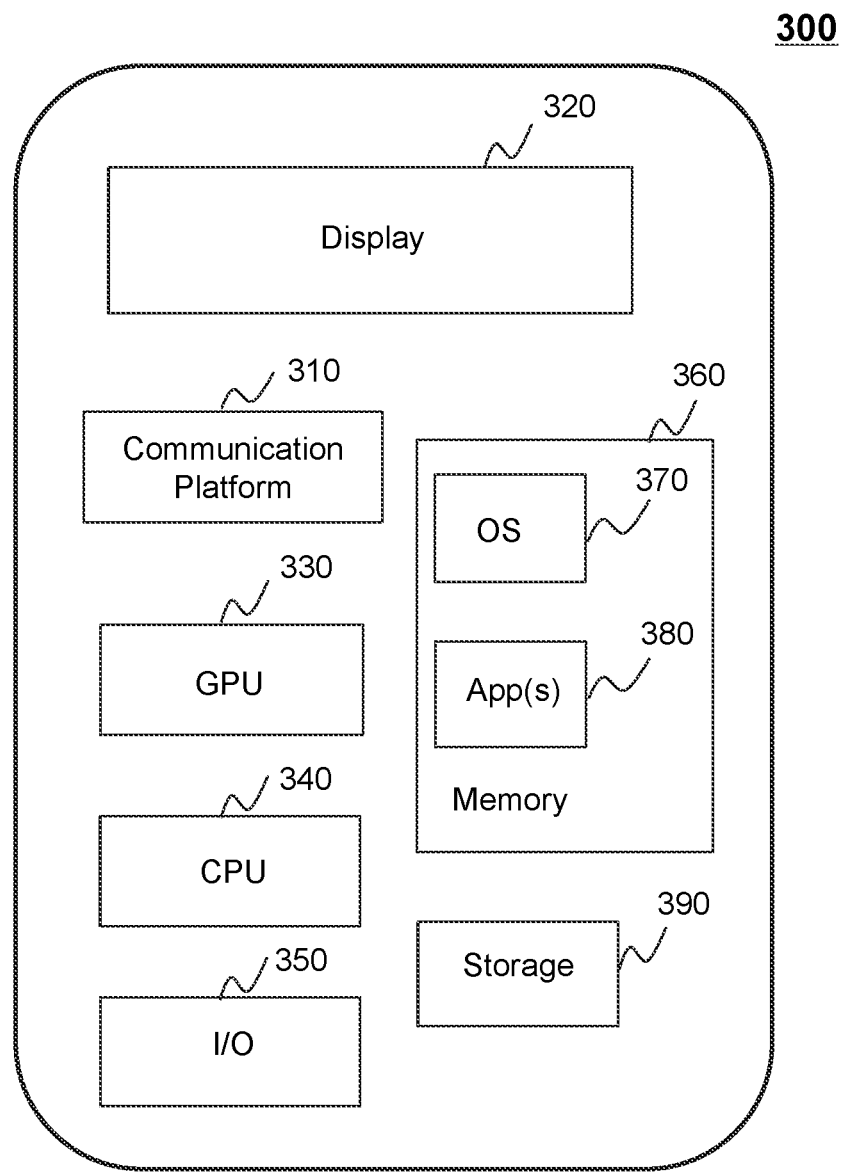
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device 300 according to some embodiments of the present disclosure. In some embodiments, the mobile device 300 may be an exemplary embodiment corresponding to the terminal 130. As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300.

In some embodiments, an operating system 370 (e.g., iOS™, Android™' Windows Phone™, etc.) and one or more applications 380 may be loaded into the memory 360 from the storage 390 in order to be executed by the CPU 340. The applications 380 may include a browser or any other suitable mobile apps for receiving and rendering information relating to image processing or other information from the video processing system 100. User interactions with the information stream may be achieved via the I/O 350 and provided to the storage device 150, the capture device 110 and/or other components of the video processing system 100.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a system if appropriately programmed.

Figure 4:
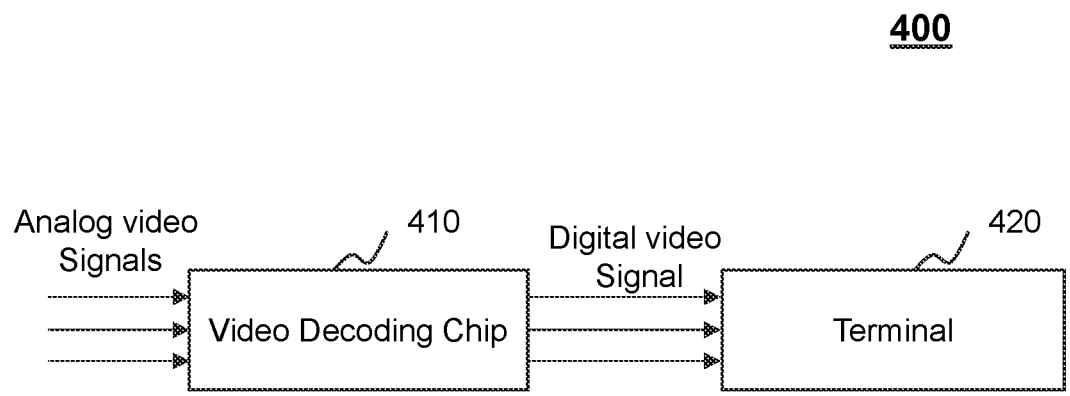
FIG. 4 shows an exemplary application scenario of a video decoding chip according to some embodiments of the present disclosure.

FIG. 4 shows an exemplary application scenario of a video decoding chip according to some embodiments of the present disclosure. The video decoding chip 410 may be disposed in a digital video recorder (DVR), a network video recorder (NVR), or the like. As shown in FIG. 4, the video decoding chip 410 may be configured to decode analog video signals (also referred to as encoded video data) to generate digital video signals (also referred to as decoded video data). In some embodiments, the digital video signals may be digital YUV signals.

The video decoding chip 410 may be connected with one or more video sources (e.g., cameras) and may be configured to receive different streams of analog video signals from the one or more video sources (e.g., cameras). For example, the video decoding chip 410 may be connected with four video sources, and receive four streams of analog video signals from the four video source, respectively. The analog video signals may be transmitted from the video source(s) to the video decoding chip 410 via a wired connection or a wireless connection. The wired connection may include a metal cable, a coaxial cable, a twisted-pair cable, a two-core wire, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. In some embodiments, the video decoding chip 410 may include one or more input channels. Each of the one or more input channels may be capable of receiving a stream of analog video signals and decoding the stream of analog video signals. Each input channel may include one or more function modules. In some embodiments, the one or more function modules may include an Equalizer (EQ) module, an Active Front End (AFE) module, a vSphere Data Protection (VDP) decoding module, or the like. The one or more function modules on an input channel may be configured to decode a stream of analog video signals and generate the corresponding stream of digital video signals. The EQ module may be configured to correct/equilibrate the frequency characteristics of video signals on the input channel. The AFE module may be configured to convert alternating current (AC) signals into direct current (DC) signals. The VDP decoding module may be configured to decode the stream of analog video signals to generate the stream of digital video signals. In some embodiments, the EQ module, the AFE module and the VDP decoding module may be connected in sequence. That is, after the steam of analog video signals are processed by the EQ module and/or the AFE module, the VDP decoding module may decode the stream of processed analog video signals to generate the corresponding stream of digital video signals.

The video decoding chip 410 may be further configured to transmit the generated digital video signals to the terminal 420. The terminal 420 may include personal computers, laptops, tablets, smartphones, portable wearable devices, or the like, or any combination thereof. In some embodiments, the terminal 420 may be configured to display the digital video signals on a display screen of the terminal 420. The terminal 420 may also be configured to compress the digital video signals and store the compressed video signals into a storage of the terminal 420. In some embodiments, the video decoding chip 410 may include one or more output channels coupled to the one or more input channels. Each of the one or more output channels may be capable of outputting a stream of digital video signals. Thus, the video decoding chip 410 may transmit one or more streams of digital video signals to the terminal 420. In some embodiments, the video decoding chip 410 may transmit the one or more steams of digital video signals to one terminal 420. The terminal 420 may synchronously display the one or more streams of digital video signals on the display screen. In some embodiments, the video decoding chip 410 may transmit the one or more streams of digital video signals to one or more terminals 420, each of which may display one corresponding steam of digital video signals. The digital video signals may be transmitted from the video decoding chip 410 to the terminal 420 via a wired connection or a wireless connection. The wired connection may include a metal cable, a coaxial cable, a twisted-pair cable, a two-core wire, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the input channel may further include a video detection component configured to detect whether there is a stream of analog video signals on an input channel. If the input channel has a stream of analog video signals, the function modules (e.g., the EQ module, the AFE module, the VDP decoding module) may be turned into the open state to decode the stream of analog video signals. If the input channel does not have a stream of analog video signals, the function modules (e.g., the EQ module, the AFE module, the VDP decoding module) may be turned into the closed state.

Figure 5:
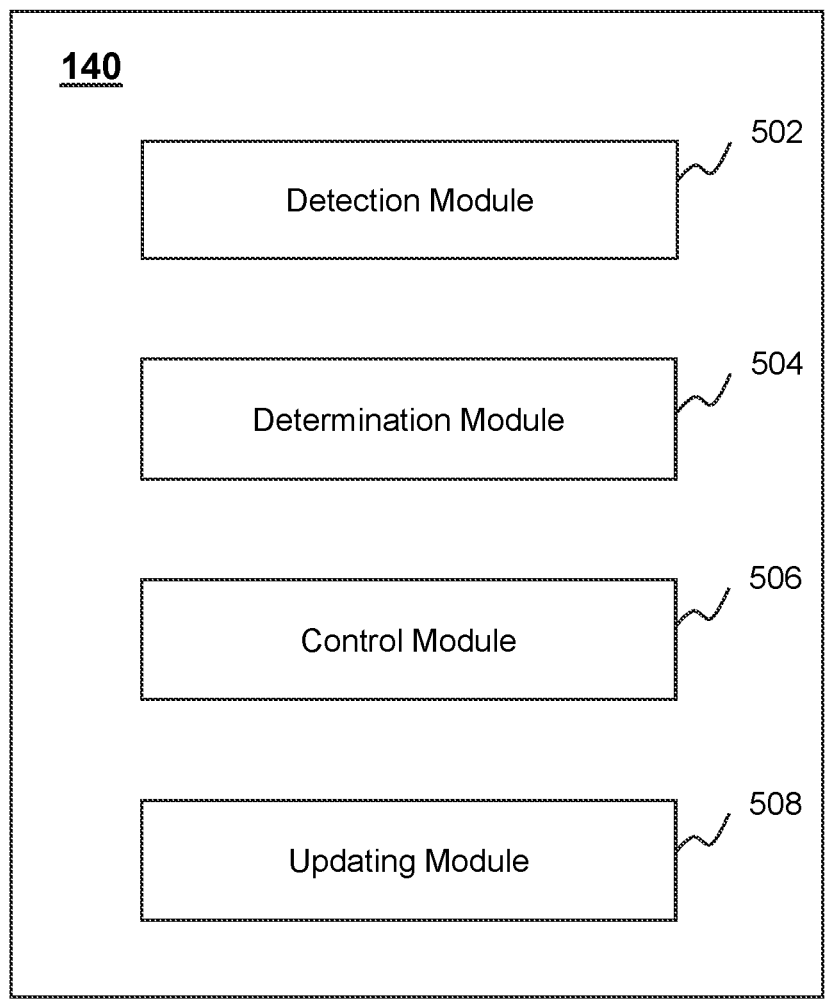
FIG. 5 is a block diagram illustrating an exemplary processing device according to some embodiments of the present disclosure.

FIG. 5 is a block diagram illustrating an exemplary processing device according to some embodiments of the present disclosure. The processing device 140 may include a detection module 502, a determination module 504, a control module 506, and an updating module 508. The modules may be hardware circuits of all or part of the processing device 140. The modules may also be implemented as an application or a set of instructions read and executed by the processing device 140. Further, the modules may be any combination of the hardware circuits and the application/instructions. For example, the modules may be the part of the processing device 140 when the processing device 140 is executing the application/set of instructions.

The detection module 502 may be configured to detect information and/or data relating to a video decoding chip. The video decoding chip may include one or more input channels and one or more output channels. In some embodiments, the detection module 502 may detect a flag bit of each of one or more input channels. The flag bit of an input channel may indicate a status of receiving its corresponding stream of encoded video data. In some embodiments, the flag bit may be of a first value or a second value. If the flag bit of an input channel is of the first value, it may indicate that no stream of encoded video data is transmitted to the input channel. If the flag bit of an input channel is of the second value, it may indicate that a stream of encoded video data is transmitted to the input channel. In some embodiments, the detection module 502 may also be configured to detect whether the flag bit of the one or more input channels changes.

The determination module 504 may be configured to determine at least one target input channels. In some embodiments, the determination module 504 may determine whether the flag bit of at least one of the one or more input channels is of the second value. In response to a determination that the flag bit of the at least one of the one or more input channels is of the second value, the determination module 504 may determine the at least one input channel as at least one target input channel. The determination module 504 may also be configured to determine an output mode corresponding to the at least one target input channel and determine at least one of the one or more output channels based on the output mode. More descriptions of the determination of the at least one output channel may be found elsewhere in the present disclosure (e.g., FIG. 6 and the descriptions thereof).

The control module 506 may be configured to control an operating state of the one or more input channels. In some embodiments, the operating state of an input channel may include an open state or a closed state. In some embodiments, an input channel may include one or more function modules, such as an EQ module, an AFE module, a VDP decoding module, or the like. The control module 506 may control input channel(s) whose flag bit is of the second value (also referred to as target input channel(s)) to be in the open state. Specifically, the control module 506 may control the function module(s) of the input channel(s) to be in the open state. The control module 506 may control input channel(s) whose flag bit is of the first value to be in the closed state. The control module 506 may control the function module(s) of the input channel(s) to be in the closed state.

The updating module 508 may be configured to update the at least one target input channel. For example, if the flag bit of a first input channel of the one or more input channels changes from the first value to the second value, the updating module 508 may update the at least one target input channel by designating the first input channel as one of the at least one target input channel. As another example, if the flag bit of a second input channel of the one or more input channels changes from the second value to the first value, the updating module 508 may update the at least one target input channel by removing the second input channel from the at least one target input channel. In some embodiments, the updating module 508 may also be configured to update the output mode. More descriptions of the updating of the output mode may be found elsewhere in the present disclosure (e.g., FIG. 7 and the relevant descriptions thereof).

The modules in the processing device 140 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the processing device 140 may further include one or more additional modules. For example, the processing device 140 may further include a storage module (not shown in FIG. 4) configured to store data generated by one or more of the modules of the processing device 140.

Figure 6:
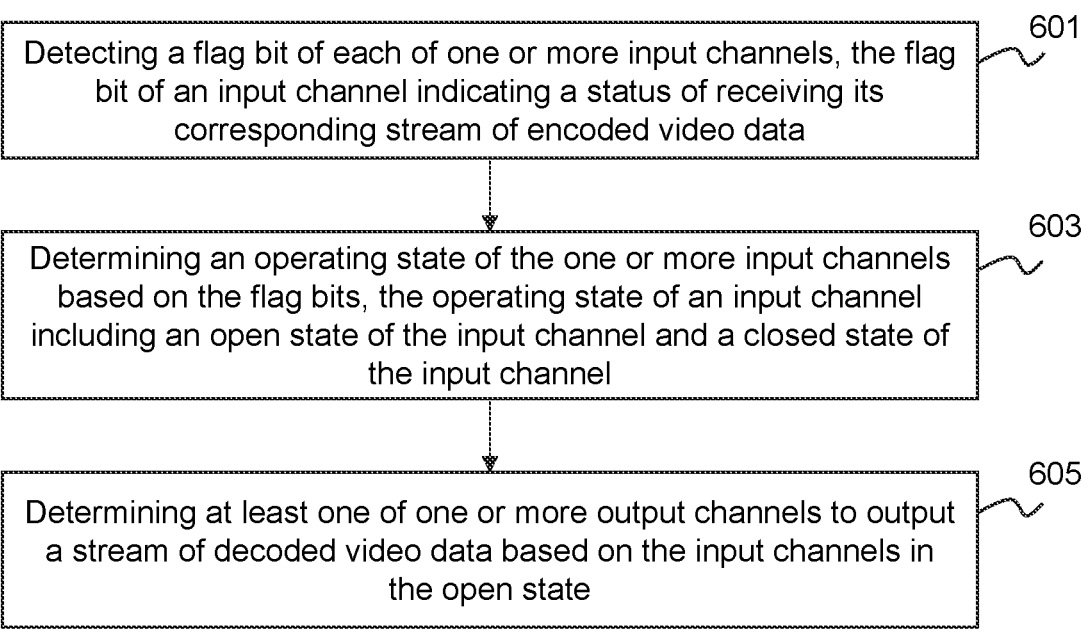
FIG. 6 is a flowchart illustrating an exemplary process for determining at least one output channel according to some embodiments of the present disclosure.

FIG. 6 is a flowchart illustrating an exemplary process for determining at least one output channel according to some embodiments of the present disclosure. For illustration purpose only, the processing device 140 may be described as a subject to perform the process 600. However, one of ordinary skill in the art would understand that the process 600 may also be performed by other entities. For example, one of ordinary skill in the art would understand that at least a portion of the process 600 may also be implemented on the computing device 200 as illustrated in FIG. 2 or the mobile device 300 as illustrated in FIG. 3. In some embodiments, one or more operations of process 600 may be implemented in the video processing system 100 as illustrated in FIG. 1. In some embodiments, one or more operations in the process 600 may be stored in the storage device 150 and/or the storage (e.g., the ROM 230, the RAM 240, etc.) in the form of instructions, and invoked and/or executed by the processing device 140 (e.g., the processor 220 of the processing device 140, or one or more modules of the processing device 140). In some embodiments, the instructions may be transmitted in the form of electronic current or electrical signals.

In some embodiments, the process 600 may be applied in a video decoding chip (e.g., the video decoding chip 410), which may be configured to decode analog video signals to generate digital video signals, and transmit the generated digital video signals to a terminal (e.g., the terminal 420). In some embodiments, the video decoding chip may include one or more input channels and one or more output channels. Each input channel may be capable of receiving a stream of encoded video data (i.e., the analog video signals) and decoding the stream of encoded video data. Each output channel may be capable of outputting a stream of decoded video data (i.e., the digital video signals).

In 601, the processing device 140 (e.g., the detection module 502) may detect a flag bit of each of one or more input channels. The flag bit of an input channel may indicate a status of receiving its corresponding stream of encoded video data. The flag bit may be represented by letters, symbols, numbers, serial numbers, or the like, or any combination thereof. In some embodiments, the flag bit of an input channel may include a first value (e.g., 0) and a second value (e.g., 1). If the flag bit of an input channel is of the first value, it may indicate that no stream of encoded video data is transmitted to the input channel. If the flag bit of an input channel is of the second value, it may indicate that a stream of encoded video data is transmitted to the input channel. When the video decoding chip does not work, the flag bit of each input channel may be of a specific value (e.g., the first value). When the video decoding chip works, the processing device 140 may continuously or intermittently detect the flag bit of each input channel in real time. In some embodiments, the flag bit may be represented as a character string, a sequence group, or the like. The flag bit may be used to reflect whether each input channel has a stream of encoded video data. For example, there may be four input channels. If the flag bit is denoted as (1, 1, 1, 1), it may indicate that each of the four input channels has a corresponding stream of encoded video data. If the flag bit is denoted as (1, 0, 1, 0), it may indicate that the first and third input channels have the corresponding streams of encoded video data, while the second and fourth input channels do not have any stream of encoded video data.

In 603, the processing device 140 (e.g., the determination module 504) may determine an operating state of the one or more input channels based on the flag bits. The operating state of an input channel may include an open state of the input channel and a closed state of the input channel. The one or more input channels may be in the open state or the closed state. In some embodiments, when the video decoding chip starts to work, the one or more input channels may be in the closed state. Alternatively, when the video decoding chip starts to work, the one or more input channels may be in the open state. Alternatively, when the video decoding chip starts to work, a portion of the input channels may be in the open state, and the other input channels may be in the closed state. If an input channel is connected to a capture device (e.g., the capture device 110) that can produce a stream of encoded video data, the processing device 140 may control the input channel to be in the open state to receive and decode the stream of encoded video data. If an input channel is not connected to a capture device (e.g., the capture device 110) that can produce a stream of encoded video data, the processing device 140 may control the input channel to be in the closed state.

Each input channel may include one or more function modules. The operating state of an input channel may refer to an operating state of at least one of the one or more function modules. In some embodiments, the one or more function modules may include an EQ module, an AFE module, a VDP decoding module, or the like. The one or more function modules of an input channel may be configured to decode a stream of encoded video data and generate a stream of decoded video data. The function module(s) of different input channels may be the same or different. More descriptions of the function modules (e.g., the EQ module, the AFE module, the VDP decoding module) may be found in, e.g., FIG. 4 and the relevant descriptions thereof. In some embodiments, if the flag bit of an input channel is of the second value, the processing device 140 may control the operating state of the input channel to be in the open state. That is, all the function module(s) of the input channel may be in the open state. For example, the processing device 140 may turn on a button or a switch of the function module(s) of the input channel to keep them in the open state. Alternatively, if the flag bit of an input channel is of the first value, the processing device 140 may control the operating state of the input channel to be in the closed state. That is, the function module(s) of the input channel may be in the closed state. For example, the processing device 140 may turn off a button or a switch of the function module(s) of the input channel to keep them in the closed state.

In 605, the processing device 140 (e.g., the determination module 504) may determine at least one of the one or more output channels to output a stream of decoded video data based on the input channels in the open state. In some embodiments, one output channel may output one or more streams of decoded video data. In some embodiments, each output channel may include a VO (video output) module. If an output channel is determined to output one or more streams of decoded video data, the processing device 140 may control the output channel to be in the open state. That is, the processing device 140 may turn on a button or a switch of the VO module of the output channel to keep it in the open state.

In some embodiments, the input channels in the open state may also be referred to as target input channels. In some embodiments, the processing device 140 may determine the video format of the stream of encoded video data on each target input channel. The video format may be used to characterize performance parameters of a stream of encoded video data. In some embodiments, the video format of a stream of encoded video data may include a data volume of the stream of encoded video data, a resolution of the stream of encoded video data, or the like, or any combination thereof.

In some embodiments, the processing device 140 may determine an output mode corresponding to the target input channels based on the video format of the stream of encoded video data on each target input channel. The output mode may include a 4X mode, a 2X mode, a 1X mode, or the like. The 4X mode may refer to that four input channels correspond to one output channel. For example, four streams of video data decoded by four input channels, respectively, may be jointly outputted via one output channel. The 2X mode may refer to that two input channels correspond to one output channel. For example, four streams of video data decoded by four input channels, respectively, may be outputted via two output channels. The 1X mode may refer to that one input channel corresponds to one output channel. For example, four streams of video data decoded by four input channels, respectively, may each be outputted via a distinctive output channel. In some embodiments, the processing device 140 may determine the at least one output channel based on the output mode. Merely by way of example, the video decoding chip may include four input channels and four output channels. As shown in FIG. 8B, the four input channels (input channels 1'-4') may each receive a stream of encoded video data and generate the corresponding stream of decoded video data. If the output mode determined by the processing device 140 is a 4X mode, the processing device 140 may determine one output channel to output the four streams of decoded video data. As shown in FIG. 8B, the four streams of decoded video data may be outputted by the output channel 1'. It should be noted that the processing device 140 can determine the output channel 2' (or output channel 3', or output channel 4') to output the four streams of decoded video data.

In some embodiments of the present disclosure, if an input channel does not receive a stream of encoded video data, the processing device 140 may control the input channel to be in the closed state, which may reduce the power consumption of the video decoding chip, and extend the service life of the video decoding chip. Besides, the processing device 140 may determine the output mode based on the video format on each target input channel, and determine the output channel(s) based on the output mode. In some embodiments, one output channel may correspond to one or more input channels, and output one or more streams of decoded video data from the one or more input channels. The processing device 140 may control the output channel(s) that does not output the stream(s) of decoded video data in the closed state, thereby reducing the power consumption of the video decoding chip.

It should be noted that the above description regarding the process 600 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. The processing device 140 may need to detect the flag bit of each input channel continuously or intermittently (e.g., every 10 minutes, 30 minutes). In some embodiments, one or more new video sources may be connected to the video decoding chip, or one or more existing video sources may be disconnected from the video decoding chip. Once the flag bit of an input channel changes, the processing device 140 may adjust the operating status of the input channel. For example, if an existing video source is disconnected from the input channel (i.e., the flag bit changing from 1 to 0), the processing device 140 may turn that input channel into the closed state. As another example, if a new video source is connected to the input channel (i.e., the flag bit changing from 0 to 1), the processing device 140 may turn that input channel into the open state.

Figure 7:
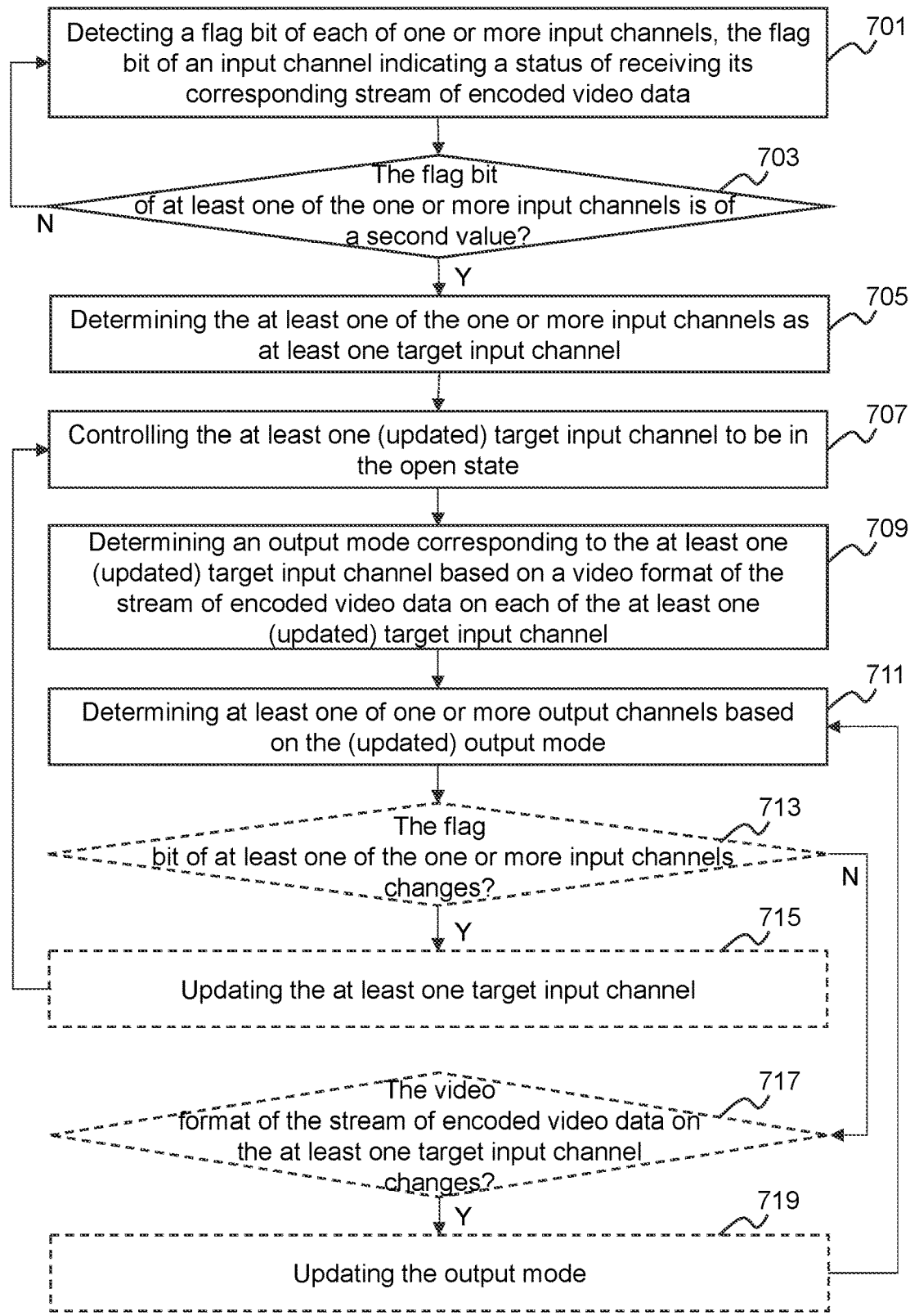
FIG. 7 is a flowchart illustrating an exemplary process for determining at least one output channel according to some embodiments of the present disclosure.

FIG. 7 is a flowchart illustrating an exemplary process for determining at least one output channel according to some embodiments of the present disclosure. For illustration purpose only, the processing device 140 may be described as a subject to perform the process 700. However, one of ordinary skill in the art would understand that the process 700 may also be performed by other entities. For example, one of ordinary skill in the art would understand that at least a portion of the process 700 may also be implemented on the computing device 200 as illustrated in FIG. 2 or the mobile device 300 as illustrated in FIG. 3. In some embodiments, one or more operations of the process 700 may be implemented in the video processing system 100 as illustrated in FIG. 1. In some embodiments, one or more operations in the process 700 may be stored in the storage device 150 and/or the storage (e.g., the ROM 230, the RAM 240, etc.) in the form of instructions, and invoked and/or executed by the processing device 140 (e.g., the processor 220 of the processing device 140, or one or more modules of the processing device 140). In some embodiments, the instructions may be transmitted in the form of electronic current or electrical signals.

In 701, the processing device 140 (e.g., the detection module 502) may detect a flag bit of each of one or more input channels. The flag bit of an input channel may indicate a status of receiving its corresponding stream of encoded video data. The flag bit of an input channel may be of a first value or a second value. In some embodiments, when the video decoding chip works, the processing device 140 may detect the flag bit of each input channel continuously. Alternatively, the processing device 140 may detect the flag bit of each input channel intermittently, such as every 5 minutes, every 10 minutes, every 15 minutes, every 30 minutes, or the like.

In 703, the processing device 140 (e.g., the detection module 502) may detect whether the flag bit of at least one of the one or more input channels is of a second value. In response to a determination that none of the flag bits of the one or more input channels is of the second value, it may indicate that no stream of encoded video data is received by any input channel, and the processing device 140 may proceed to operation 701. The processing device 140 may continue to detect the flag bit of the one or more input channels.

Alternatively or additionally, in response to a determination that the flag bit of at least one of the one or more input channels is of the second value, it may indicate that there is a stream of encoded video data on the at least one input channel, and the processing device 140 may proceed to operation 705. In 705, the processing device 140 (e.g., the determination module 504) may determine the at least one of the one or more input channels as at least one target input channel. In 707, the processing device 140 (e.g., the control module 506) may control the at least one target input channel to be in the open state. A target input channel may include one or more function modules. The processing device 140 may control the function module(s) of the at least one target input channel to be in the open state.

In 709, the processing device 140 (e.g., the determination module 504) may determine an output mode corresponding to the at least one target input channel based on a video format of the stream of encoded video data on each of the at least one target input channel. The video format may be used to characterize performance parameters of a stream of encoded video data. In some embodiments, the video format of a stream of encoded video data may include a data volume of the stream of encoded video data, a resolution of the stream of encoded video data, or the like, or any combination thereof. In some embodiments, the processing device 140 may obtain the video format of the stream of encoded video data on each target input channel. The processing device 140 may determine the output mode based on the video format(s). Merely by way of example, as shown in FIG. 8B, there may be four target input channels. The resolution of the stream of encoded video data on each target input channel may be 720P. The maximum resolution range on each input channel and/or output channel may be 4K-4M, which is greater than 4*720P. That is, the four streams of video data, decoded by the four target input channels respectively, may be outputted via one output channel. Thus, the processing device 140 may determine the output mode as a 4X mode. As another example, as shown in FIG. 8C, there may be four target input channels. The resolution of the stream of encoded video data on each target input channel may be 1080P. The maximum resolution range on each input channel and/or output channel may be 4K-4M, which is greater than 2*1080P. That is, the four streams of video data, decoded by the four target input channels respectively, may be outputted via two output channels. Thus, the processing device 140 may determine the output mode as a 2X mode. As a further example, as shown in FIG. 8D, there may be only one target input channel. The stream of video data decoded by the target input channel may be outputted via one output channel. The processing device 140 may determine the output mode as a 1X mode.

In 711, the processing device 140 (e.g., the determination module 504) may determine at least one of one or more output channels based on the output mode. In some embodiments, there may be four streams of video data decoded by four input channels, respectively. If the output mode is a 4X mode, the processing device 140 may determine one output channel configured to output four streams of decoded video data. If the output mode is a 2X mode, the processing device 140 may determine two output channels, each of which is configured to output two streams of decoded video data. The at least one output channel may be used to output one or more streams of decoded video data. In some embodiments, one output channel may output only one stream of decoded video data. Alternatively, one output channel may output two or more streams of decoded video data (e.g., 2 streams of decoded video data, 4 streams of decoded video data). In some embodiments, each output channel may include an VO (video output) module. The output channel(s) (or VO module(s)) may be in the open state or the closed state. If an output channel is determined to output one or more streams of decoded video data, the processing device 140 may control the output channel (i.e., the VO module) to be in the open state. The processing device 140 may control the other output channel(s) (i.e., the corresponding VO module(s)) to be in the closed state.

In some embodiments, one or more new video sources may be connected to the video decoding chip. That is, one or more new streams of video data may be transmitted to corresponding input channels of the video decoding chip (the flag bit of the input channels may change). In this case, the processing device 140 may need to control the input channels corresponding to the new streams of video data to be in the open state. In some embodiments, the video format on the at least one target input channel may change (e.g., the resolution of a stream of encoded video data may change). In this case, the processing device 140 may need to re-determine the output mode and the output channel(s). Thus, the processing device 140 may need to intermittently or continuously detect whether the flag bit of the one or more input channels changes and detect whether the video format on the at least one target input channel changes. More descriptions of the detection may be found in, e.g., operations 713-719.

In 713, the processing device 140 (e.g., the detection module 502) may detect whether the flag bit of at least one of the one or more input channels changes. The change of the flag bit may include: changing from the first value to the second value (e.g., 0-1), changing from the second value to the first value (e.g., 1-0), changing from the second value to the first value then to the second value (e.g., 1-0-1). If the flag bit of an input channel changes from the first value to the second value, it may indicate that a new video source is connected to the input channel. If the flag bit of an input channel changes from the second value to the first value, it may indicate that the existing video source is disconnected from the input channel. If the flag bit of an input channel changes from the second value to the first value then to the second value, it may indicate that the existing video source is disconnected from the input channel and a new video source is connected to the input channel.

In response to a determination that the flag bit of the at least one of the one or more input channels changes, the processing device 140 may proceed to operation 715. In 715, the processing device 140 (e.g., the updating module 508) may update the at least one target input channel. In some embodiments, in response to a determination that the flag bit of a first input channel of the one or more input channels changes from the first value to the second value, the processing device 140 (e.g., the updating module 508) may update the at least one target input channel by designating the first input channel as one of the at least one target input channel. After the at least one target input channel is updated, the processing device 140 may proceed to operation 707. In 707, the processing device 140 may control the at least one updated target input channel to be in the open state. In some embodiments, in response to a determination that the flag bit of a second input channel of the one or more input channels changes from the second value to the first value, the processing device 140 (e.g., the updating module 508) may update the at least one target input channel by removing the second input channel from the at least one target input channel. After the at least one target input channel is updated, the processing device 140 may proceed to operation 707. In 707, the processing device 140 may control the at least one updated target input channel to be in the open state. The processing device 140 may control the second input channel to be in the closed state.

Alternatively or additionally, in response to a determination that the flag bit of the one or more input channels does not change, the processing device 140 may proceed to operation 717. In 717, the processing device 140 (e.g., the detection module 502) may detect whether the video format of the stream of encoded video data on the at least one target input channel changes. The change of the video format of a stream of encoded video data may refer to a change of resolution of the stream of encoded video data, a change of data volume of the stream of encoded video data, or the like. In response to a determination that the video format of the stream of encoded video data on the at least one target input channel changes, the processing device 140 may proceed to operation 719. In 719, the processing device 140 (e.g., the updating module 508) may update the output mode. The processing device 140 may determine an updated output mode based on the changed video format of the stream of encoded video data on each of the target input channels. Merely by way of example, as shown in FIG. 8B, the resolution of the stream of encoded video data on each target input channel may be 720P. The output mode determined by the processing device 140 may be the 4X mode. If the resolution of at least one stream of encoded video data is changed, the processing device 140 may determine a total resolution of the four streams of encoded video data, and determine an updated output mode based on the total resolution. For example, if the resolution of the four streams of encoded video data are changed (e.g., the resolution of the four streams of encoded video data becoming 1080P shown in FIG. 8C), the processing device 140 may determine the total resolution of the four streams of encoded video data (i.e., 4*1080P). Since the maximum resolution range on each input channel and/or output channel may be 4K-4M, which is greater than 2*1080P and less than 4*1080P, the processing device 140 may update the output mode as a 2X mode. As another example, if the resolution of one stream of encoded video data is changed (e.g., the resolution of the stream of encoded video data becoming 1080P), the processing device 140 may determine the total resolution of the four streams of encoded video data (i.e., 3*720P+1080P). Since the maximum resolution range on each input channel and/or output channel may be 4K-4M, which is greater than (3*720P+1080P), the processing device 140 may still determine the output mode as the 4X mode. Then the processing device 140 may proceed to operation 711. In 711, the processing device 140 may determine at least one of the one or more output channels based on the updated output mode.

In some embodiments, the processing device 140 may determine four conditions in connection with the change of the flag bit(s) and the change of the video format(s).

In some embodiments, the flag bit of the at least one of the one or more input channels may change, and the video format of the stream of encoded video data on the at least one target input channel may change. The processing device 140 may update the at least one target input channel. For example, the processing device 140 may determine the input channels whose flag bits are of the second value as the target input channels. The processing device 140 may then control the target input channels to be in the open state. The processing device 140 may update the output mode based on changed video format of the stream of encoded video data on each of the target input channels, and determine the at least one output channel based on the updated output mode.

In some embodiments, the flag bit of the one or more input channels may not change, and the video format of the stream of encoded video data on the at least one target input channel may change. In this case, no video source may be connected to or disconnected from the video decoding chip, and thus, the at least one target input channel may not need to be updated. The processing device 140 may update the output mode based on changed video format of the stream of encoded video data on each of the target input channels, and determine the at least one output channel based on the updated output mode.

In some embodiments, the flag bit of the at least one of the one or more input channels may change, and the video format of the stream of encoded video data on the at least one target input channel may not change. In this case, one or more video sources may be connected to or disconnected from the video decoding chip, and thus, the at least one target input channel may need to be updated. In some embodiments, when a video source is disconnected from an input channel of the video decoding chip, the video format on the input channel may not be changed. In this case, the video format of the stream of encoded video data on the input channel may be equal to a default video format of the input channel. Since the stream of encoded video data is disconnected from the input channel, the video format on the input channel cannot be used to determine the output mode. That is, the output mode may need to be updated. Specifically, the processing device 140 may determine the input channels whose flag bits are of the second value as the target input channels. The processing device 140 may then control the target input channels to be in the open state. The processing device 140 may update the output mode based on the video format of the stream of encoded video data on each of the target input channels, and determine the at least one output channel based on the updated output mode.

In some embodiments, the flag bit of the one or more input channels may not change, and the video format of the stream of encoded video data on the at least one target input channel may not change. In this case, no video source may be connected to or disconnected from the video decoding chip, and thus, the at least one target input channel may not need to be updated. Since the video format of the stream of encoded video data on the at least one target input channel does not change, the processing device 140 may not need to update the output mode.

It should be noted that the above description regarding the process 700 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the processing device 140 may simultaneously detect whether the flag bit of at least one of the one or more input channels changes and the video format of the stream of encoded video data on the at least one target input channel changes. In some embodiments, operation 705 may be omitted. In response to a determination that the flag bit of at least one of the one or more input channels is of the second value, the processing device 140 may proceed to operation 707. In 707, the processing device 140 may control the at least one input channel whose flag bit is of the second value to be in the open state.

FIGS. 8A-8D show four exemplary video decoding processes of a video decoding chip according to some embodiments of the present disclosure. The video decoding chip may include four input channels and four output channels. The maximum resolution range on each input channel and/or output channel may be 4K-4M.

Figure 8A:
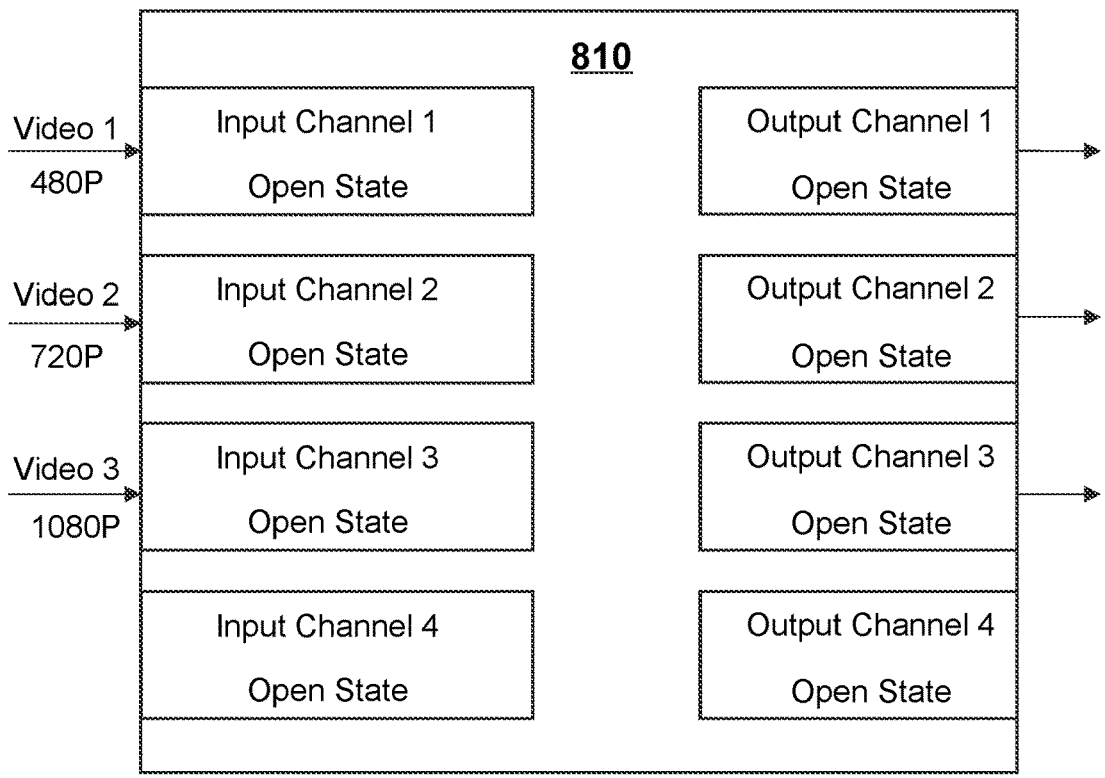
FIGS. 8A-8D show four exemplary video decoding processes of a video decoding chip according to some embodiments of the present disclosure.
Figure 8B:
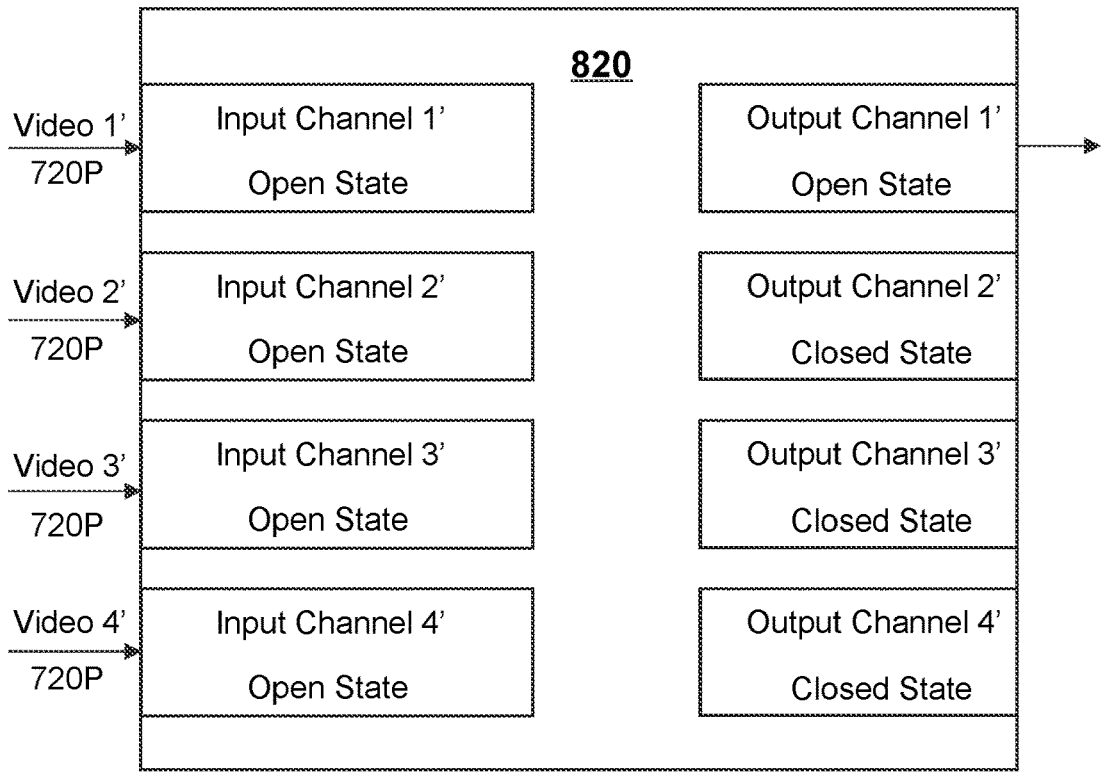
Figure 8C:
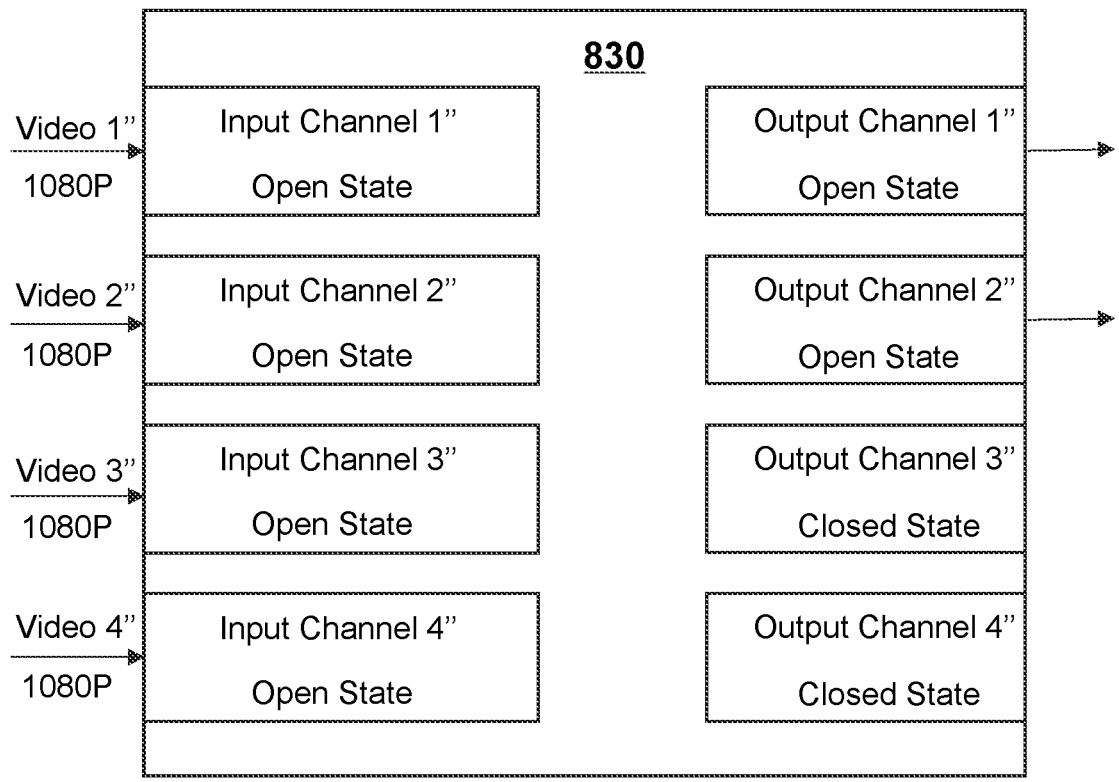
Figure 8D:
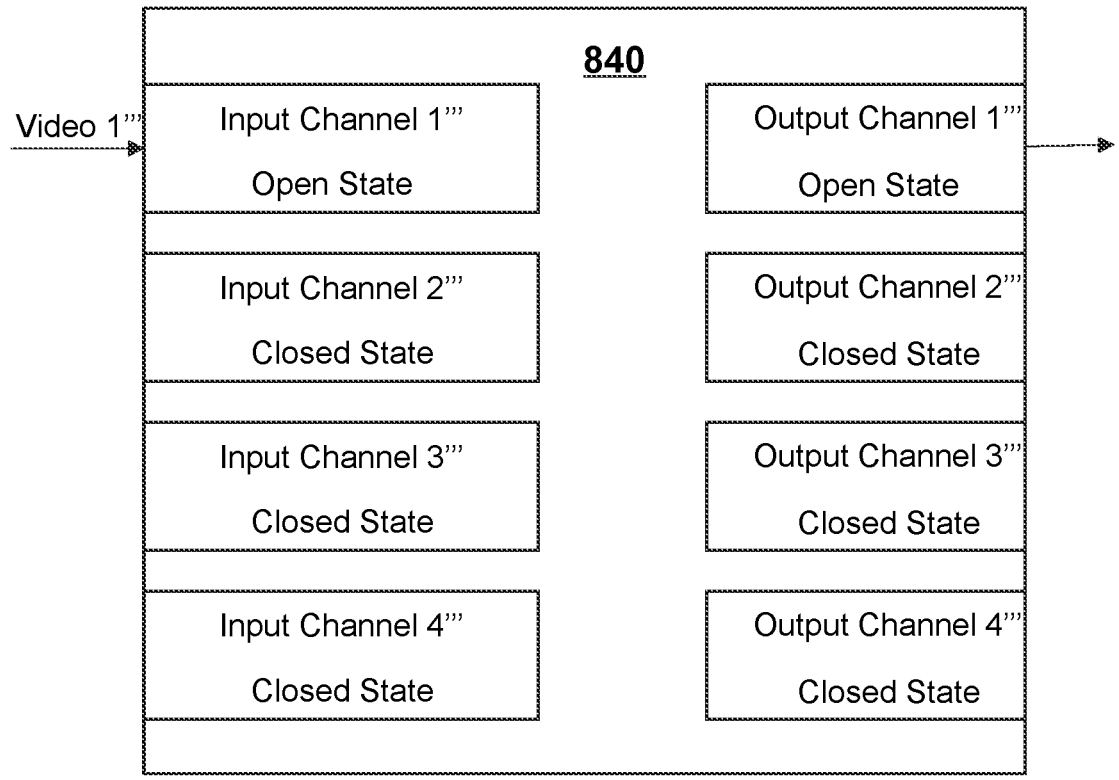

FIG. 8A shows a video decoding process of a video decoding chip 810. The output mode of the video decoding chip 810 may be 1X. That is, one output channel may correspond to one input channel. As shown in FIG. 8A, a first video source (marked as video 1 for simplicity) may be connected to input channel 1. A stream of encoded video data from the video 1 may be transmitted to the input channel 1. The resolution of the stream of encoded video data may be 480P. The input channel 1 may decode the stream of encoded video data. The output channel 1 may then output the stream of decoded video data to a terminal (not shown in FIG. 8A). A second video source (marked as video 2 for simplicity) may be connected to input channel 2. A stream of encoded video data from the video 2 may be transmitted to the input channel 2. The resolution of the stream of encoded video data may be 720P. The input channel 2 may decode the stream of encoded video data. The output channel 2 may then output the stream of decoded video data to a terminal (not shown in FIG. 8A). A third video source (marked as video 3 for simplicity) may be connected to input channel 3. A stream of encoded video data from the video 3 may be transmitted to the input channel 3. The resolution of the stream of encoded video data may be 1080P. The input channel 3 may decode the stream of encoded video data. The output channel 3 may then output the stream of decoded video data to a terminal (not shown in FIG. 8A). As shown in FIG. 8A, regardless of whether an input channel receives of a stream of encoded video data or not, the input channel and its corresponding output channel may be in the open state. For example, input channel 4 and output channel 4 may always be in the open state. That is, when the video decoding chip 810 is working, all input channels and output channels may be in the open state.

FIG. 8B shows a video decoding process of a video decoding chip 820 according to some embodiments of the present disclosure. The output mode of the video decoding chip 820 may be 4X. That is, one output channel may correspond to four input channels. As shown in FIG. 8B, a first video source (marked as video 1' for simplicity) may be connected to input channel 1'. A stream of encoded video data from the video 1' may be transmitted to the input channel 1'. The input channel 1' may decode the stream of encoded video data. A second video source (marked as video 2' for simplicity) may be connected to input channel 2'. A stream of encoded video data from the video 2' may be transmitted to the input channel 2'. The input channel 2' may decode the stream of encoded video data. A third video source (marked as video 3' for simplicity) may be connected to input channel 3'. A stream of encoded video data from the video 3' may be transmitted to the input channel 3'. The input channel 3' may decode the stream of encoded video data. A fourth video source (marked as video 4' for simplicity) may be connected to input channel 4'. A stream of encoded video data from the video 4' may be transmitted to the input channel 4'. The input channel 4' may decode the stream of encoded video data. The resolution of each of the four streams of encoded video data may be 720P. Since the maximum resolution range on each input channel and/or output channel may be 4K-4M (greater than 4*720P), an output channel (e.g., output channel 1') can output the four streams of decoded video data. Other output channels (output channels 2'-4') may be in the closed state, which may reduce the power consumption of the video decoding chip 820.

FIG. 8C shows a video decoding process of a video decoding chip 830 according to some embodiments of the present disclosure. The output mode of the video decoding chip 830 may be 2X. That is, one output channel may correspond to two input channels. As shown in FIG. 8C, a first video source (marked as video 1" for simplicity) may be connected to input channel 1". A stream of encoded video data from the video 1" may be transmitted to the input channel 1". The input channel 1" may decode the stream of encoded video data. A second video source (marked as video 2" for simplicity) may be connected to input channel 2". A stream of encoded video data from the video 2" may be transmitted to the input channel 2". The input channel 2" may decode the stream of encoded video data. A third video source (marked as video 3" for simplicity) may be connected to input channel 3". A stream of encoded video data from the video 3" may be transmitted to the input channel 3". The input channel 3" may decode the stream of encoded video data. A fourth video source (marked as video 4" for simplicity) may be connected to input channel 4". A stream of encoded video data from the video 4" may be transmitted to the input channel 4". The input channel 4" may decode the stream of encoded video data. The resolution of each of the four streams of encoded video data may be 1080P. Since the maximum resolution range on each input channel and/or output channel may be 4K-4M (greater than 2*1080P), an output channel can output two streams of decoded video data. For example, output channel 1" and output channel 2" may be in the open state, each of which is configured to output two streams of decoded video data. Other output channels (output channels 3" and 4") may be in the closed state, which may reduce the power consumption of the video decoding chip 830.

FIG. 8D shows a video decoding process of a video decoding chip 840 according to some embodiments of the present disclosure. The output mode of the video decoding chip 840 may be 1X. That is, one output channel may correspond to one input channels. As shown in FIG. 8D, a first video source (marked as video 1"' for simplicity) may be connected to input channel 1'''. A stream of encoded video data from the video 1'' may be transmitted to the input channel 1'''. The input channel 1'' may decode the stream of encoded video data. The resolution of the stream of encoded video data may be any value smaller than 4K (e.g., 480P, 720P, 1080P). The output channel 1'' may output the stream of decoded video data. No video source may be connected to input channels 2''-4''. The input channels 2''-4'' may be in the closed state. The output channels 2''-4'' may not need to output the stream of decoded video data, and may be in the closed state. Thus, the power consumption of video decoding chip 840 may be reduced.

It should be noted that the above video decoding processes are merely provided for the purposes of illustration, and not intended to limit the scope of the present disclosure. In some embodiments, the video decoding chip may include other number of input channels and output channels (e.g., six input channels and output channels, eight input channels and output channels). In some embodiments, one or more video sources (e.g., one video source, two video sources, three video sources, four video sources) may be connected to the video decoding chip. In some embodiments, a stream of encoded video data on an input channel may have any suitable resolution (e.g., 480P, 720P, 1080P, 4K). The resolutions of different streams of encoded video data on different channels may be the same or different.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system for video decoding, comprising:
input channels, each of the input channels being capable of receiving a stream of encoded video data and decoding the stream of encoded video data;
output channels coupled to the input channels, each of the output channels being capable of outputting a stream of decoded video data;
at least one storage device storing a set of instructions;
at least one processor in communication with the at least one storage device, wherein when executing the set of instructions, the at least one processor is configured to cause the system to perform one or more operations including:
  detecting a flag bit of each of the input channels, the flag bit of an input channel indicating whether there is a stream of encoded video data being transmitted to the input channel, different input channels having different flag bits, respectively;
  determining, based on the flag bits, an operating state of the input channels, the operating state of an input channel including an open state of the input channel and a closed state of the input channel;
  determining, based on a video format of the stream of encoded video data on each of at least one target input channel of the input channels in the open state, an output mode corresponding to the at least one target input channel, wherein the output mode includes a 4X mode, a 2X mode, or a 1X mode, the 4X mode referring to that four input channels correspond to one output channel, the 2X mode referring to that two input channels correspond to one output channel, the 1X mode referring to that one input channel corresponds to one output channel; and
  determining, based on the output mode corresponding to the at least one target input channel, at least one of the output channels to output the corresponding stream of decoded video data.

2. The system of claim 1, wherein the flag bit of an input channel includes a first value and a second value, and to determine an operating state of the input channels, the at least one processor is configured to cause the system to perform one or more additional operations including:
  detecting whether the flag bit of at least one of the input channels is of the second value;
  in response to a determination that the flag bit of the at least one of the input channels is of the second value, determining the at least one of the input channels as the at least one target input channel; and
  controlling the at least one target input channel to be in the open state.

3. The system of claim 2, wherein the at least one processor is further configured to cause the system to perform one or more additional operations including:
  detecting whether the flag bit of at least one of the input channels changes; and
  updating the at least one target input channel based on a determination that the flag bit of the at least one of the input channels changes.

4. The system of claim 3, wherein to update the at least one target input channel, the at least one processor is configured to cause the system to perform one or more additional operations including:
  in response to a determination that the flag bit of a first input channel of the input channels changes from the first value to the second value, updating the at least one target input channel by designating the first input channel as one of the at least one target input channel.

5. The system of claim 3, wherein to update the at least one target input channel, the at least one processor is configured to cause the system to perform one or more additional operations including:
  in response to a determination that the flag bit of a second input channel of the input channels changes from the second value to the first value, updating the at least one target input channel by removing the second input channel from the at least one target input channel; and
  controlling the second input channel to be in the closed state.

6. The system of claim 1, wherein the at least one processor is configured to cause the system to perform one or more additional operations including:
  detecting whether the video format of the stream of encoded video data on the at least one target input channel changes; and
  updating the output mode based on a determination that the video format of the stream of encoded video data on the at least one target input channel changes.

7. The system of claim 6, wherein the at least one processor is configured to cause the system to perform one or more additional operations including:
  detecting intermittently or continuously whether the flag bit of at least one of the input channels changes; or
  detecting intermittently or continuously whether the video format of the stream of encoded video data on the at least one target input channel changes.

8. The system of claim 1, wherein the video format includes a data volume and a resolution of the stream of encoded video data.

9. The system of claim 1, wherein:
each input channel includes one or more function modules, wherein the operating state of the input channel refers to an operating state of at least one of the one or more function modules.

10. A method implemented on a computing device having at least one processor, at least one computer-readable storage medium, and a communication platform connected to a network, comprising:
  detecting a flag bit of each of the input channels, the flag bit of an input channel indicating whether there is a stream of encoded video data being transmitted to the input channel, different input channels having different flag bits, respectively;
  determining, based on the flag bits, an operating state of the input channels, the operating state of an input channel including an open state of the input channel and a closed state of the input channel;
  determining, based on a video format of the stream of encoded video data on each of at least one target input channel of the input channels in the open state, an output mode corresponding to the at least one target input channel, wherein the output mode includes a 4X mode, a 2X mode, or a 1X mode, the 4X mode referring to that four input channels correspond to one output channel, the 2X mode referring to that two input channels correspond to one output channel, the 1X mode referring to that one input channel corresponds to one output channel; and
  determining, based on the output mode corresponding to the at least one target input channel, at least one of the output channels to output the corresponding stream of decoded video data.

11. The method of claim 10, wherein the flag bit of an input channel includes a first value and a second value, and the determining an operating state of the input channels comprises:
- detecting whether the flag bit of at least one of the input channels is of the second value;
- in response to a determination that the flag bit of the at least one of the input channels is of the second value, determining the at least one of the input channels as the at least one target input channel; and
- controlling the at least one target input channel to be in the open state.

12. The method of claim 11, further comprising:
- detecting whether the flag bit of at least one of the input channels changes; and
- updating the at least one target input channel based on a determination that the flag bit of the at least one of the input channels changes.

13. The method of claim 12, wherein the updating the at least one target input channel comprises:
- in response to a determination that the flag bit of a first input channel of the input channels changes from the first value to the second value, updating the at least one target input channel by designating the first input channel as one of the at least one target input channel.

14. The method of claim 12, wherein the updating the at least one target input channel comprises:
- in response to a determination that the flag bit of a second input channel of the input channels changes from the second value to the first value, updating the at least one target input channel by removing the second input channel from the at least one target input channel; and
- controlling the second input channel to be in the closed state.

15. The method of claim 10, further comprising:
- detecting whether the video format of the stream of encoded video data on the at least one target input channel changes; and
- updating the output mode based on a determination that the video format of the stream of encoded video data on the at least one target input channel changes.

16. The method of claim 15, further comprising:
- detecting intermittently or continuously whether the flag bit of at least one of the input channels changes; or
- detecting intermittently or continuously whether the video format of the stream of encoded video data on the at least one target input channel changes.

17. The method of claim 10, wherein the video format includes a data volume and a resolution of the stream of encoded video data.

18. The method of claim 10, wherein:
- each input channel includes one or more function modules, wherein the operating state of the input channel refers to an operating state of at least one of the one or more function modules.

19. A non-transitory computer-readable storage medium, comprising at least one set of instructions, wherein when executed by at least one processor of a computing device, the at least one set of instructions directs the at least one processor to perform acts of:
- detecting a flag bit of each of the input channels, the flag bit of an input channel indicating whether there is a stream of encoded video data being transmitted to the input channel, different input channels having different flag bits, respectively;
- determining, based on the flag bits, an operating state of the input channels, the operating state of an input channel including an open state of the input channel and a closed state of the input channel;
- determining, based on a video format of the stream of encoded video data on each of at least one target input channel of the input channels in the open state, an output mode corresponding to the at least one target input channel, wherein the output mode includes a 4X mode, a 2X mode, or a 1X mode, the 4X mode referring to that four input channels correspond to one output channel, the 2X mode referring to that two input channels correspond to one output channel, the 1X mode referring to that one input channel corresponds to one output channel; and
- determining, based on the output mode corresponding to the at least one target input channel, at least one of the output channels to output the corresponding stream of decoded video data.

* * * * *